Jan. 20, 1959   R. E. WEBSTER   2,870,428
REAR HORN FOR VEHICLES
Filed Feb. 19, 1958
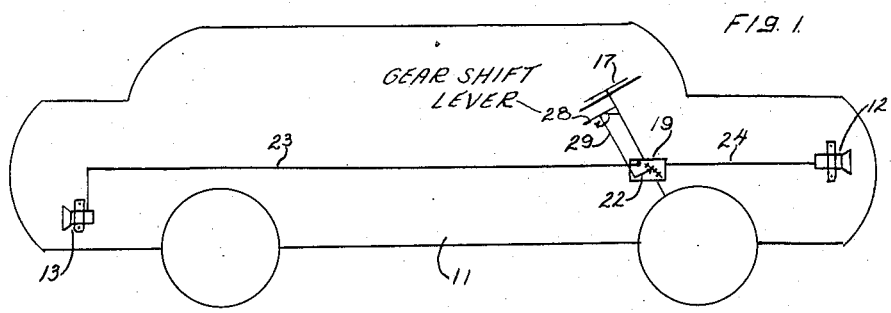
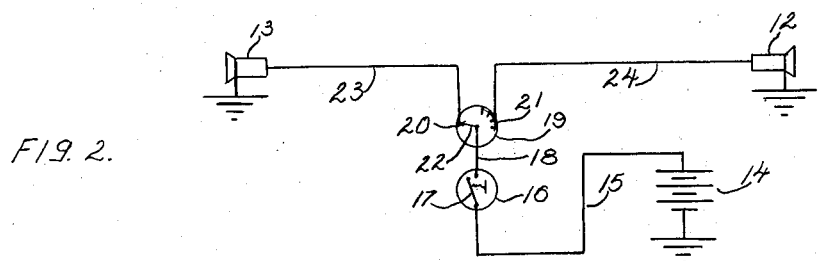
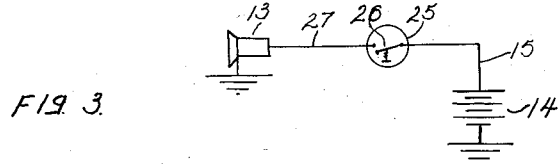
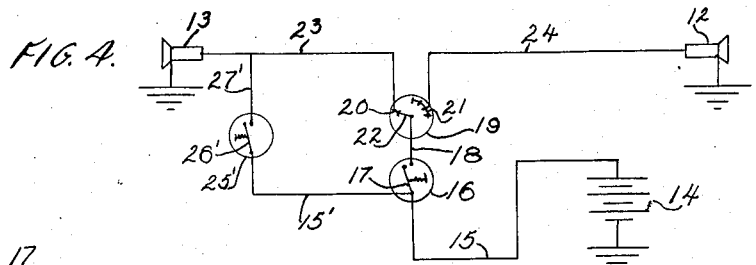
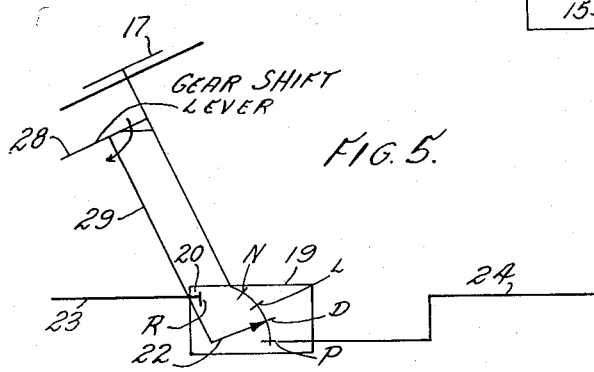
INVENTOR.
RICHARD E. WEBSTER
BY
*Robert A. Sloman*
ATTORNEY 2,870,428

REAR HORN FOR VEHICLES

Richard E. Webster, Detroit, Mich.

Application February 19, 1958, Serial No. 716,211

2 Claims. (Cl. 340—70)

This invention relates to vehicle horns and more particularly to a vehicle horn, for the rear of the vehicle.

Heretofore, many persons have been injured or killed upon the backing up of vehicles, often due to a lack of warning.

The present invention has for its primary object the location of a horn at the rear of the vehicle together with gearshift means and switch means for disconnecting the conventional front horn and connecting the rear horn for energization upon application of the horn button.

It is further the object herein to provide a gearshift operated switch mechanism whereby when the gearshift is placed in "reverse" position only the rear horn is connected for actuation by the conventional horn button. In all other control positions of the gearshift means such as "park," "neutral" or "drive" positions such switch mechanism is so actuated as to connect only the front horn with the vehicle horn button or switch.

It is the further object of the present invention to provide a rear horn for a vehicle and a horn buton independent of the conventional horn button for actuating the same as desired.

It is the further object of the present invention to provide in conjunction with a front and rear horn of a vehicle a switch means operated by the manually operable gearshift mechanism of the vehicle to permit the selective actuation of the front or rear horn, corresponding to the control position of the gearshift mechanism. And additional switch means whereby the rear horn may be separately activated when the gearshifting mechanism is set for any position other than reverse.

These and other objects will be seen from the following specification and claims in conjunction with the appended drawing in which:

Fig. 1 is a diagrammatic side elevation of a vehicle with front and rear horns and control means therefor.

Fig. 2 is a wiring diagram of the electrical connections between said horns, switches and a power source.

Fig. 3 is another wiring diagram providing separate control for a rear horn.

Fig. 4 is another wiring diagram combining the circuitry of Figs. 2 and 3.

Fig. 5 is a diagrammatic view on an enlarged scale showing the respective contacts of the control switch of Fig. 1 corresponding to the control positions of the gear shift lever.

It will be understood that the above drawing illustrates preferred embodiments of the invention and that other embodiments are contemplated within the scope of the claims hereafter set forth.

Referring to Figs. 1 and 2, there is diagrammatically shown a vehicle 11 having horn 12 mounted thereon at the forward end thereof, or a pair of such horns. A rear horn 13, or a pair thereof is located at the rear of the vehicle and suitably mounted thereon.

The power source 14, such as a conventional vehicle battery is connected by wire 15 to the horn button or horn ring 17, associated with a vehicle steering wheel, being in the nature of a normally open switch 16 by virtue of a suitable spring, and when manually closed against the action of said spring supplies electric power to wire 18 which is directed to the control switch 19, and particularly to the movable contact or contact arm 22.

In the position of the arm and contact 22 shown in Fig. 2 corresponding to a reverse control position for the manually operable gearshift means 28, Fig. 1, the contact 20 of switch 19 is engaged for supplying power through wire 23 to rear horn 13. Contact 20 is also designated as R corresponding to the "reverse" control position of gear shift lever 28.

Switch 19, has a plurality of additional spaced contacts 21, which are connected together in series, these contacts respectively corresponding to various control positions P, N, L and D (see Fig. 5) of the conventional manually operable gearshift means 28, as for example "park," "neutral," or "low" and "high" speeds. These contacts are connected in series and by wire 24 are joined to front horn 12.

Accordingly when movable contact 22 engages with any of contacts N, L, D or P, activation of horn button 17 will energize only the front horn 12.

Switch 19 is also diagrammatically shown in Fig. 1 and the movable arm or contact 22 is connected by the link or other suitable means 29 directly to the manually operable gearshift means 28 for movement in unison.

Present day vehicles have various types of manually operable gearshift means such as swinging arms or push-buttons. However, it is contemplated as a part of the present invention that the linkage 29 is such that when the gearshift is operated for controlling a reverse vehicle operation contact 22 will engage the rear horn controlling contact 20 of switch 19. Activation of horn button 17 will energize rear horn 13.

For all other positions of the gearshift means as above indicated, the movable contact 22 will be simultaneously moved to selectively engage one of the contacts 21 of control switch 19 to provide electric power to the front horn 12 upon application of horn button 17.

Accordingly the present invention incorporates with the front and rear horns 12 and 13 and in association with the conventional vehicle horn button switch, a control switch operated by the gearshift so that the horn button will activate only the rear horn when the vehicle is shifted into reverse, whether moving or not, and for all other positions of the gearshift means activation of the horn button will energize the front horn.

It is contemplated as a part of the present invention and as shown in Fig. 3 that there be a rear horn 13 or plurality of horns at the rear of the vehicle and in conjunction with the power source 14 and lead wire 15, an auxiliary rear horn switch 25 whose normally open spring biased button or contact 26 is connected to the rear horn 13 through the lead 27. This would provide means of energizing the rear horn at any time as desired.

Fig. 4 diagrammatically indicates a combination of the circuits shown in Figs. 2 and 3 and wherein there is the same circuit as shown in Fig. 2 which is correspondingly numbered and in addition thereto there is provided an auxiliary wire 15' connected with switch 25' and the normally open pushbutton 26' which is located on the vehicle in a position convenient to the driver, and connected by lead wire 27' to the rear horn 13. Auxiliary rear horn button 26' may be located on the floorboard, or the dashboard, or the steering column.

The advantage of this additional rear horn button would be that for all positions of the gearshift lever other than reverse, the rear horn may nevertheless be activated by pressing on the button 26'. Such would not be possible with the construction shown in Fig. 2.

Having described my invention, reference should now be had to the following claims.

I claim:

1. In combination with a vehicle having a front horn, a manually operable gearshift means on the vehicle movable into a reverse control position and into additional control positions, a horn located adjacent the rear of the vehicle, a control switch having a contact connected to the rear horn and additionally spaced contacts corresponding to said additional control positions connected in series with said front horn, a movable contact on said control switch joined to said gearshift means and movable in unison therewith for selective engagement with the rear horn contact and said additional contacts respectively, and a normally open horn switch interconnecting a power source with said movable contact, whereby when the gearshift means is in reverse position, the horn button is adapted to activate only the rear horn and in all other positions of the gearshift means is adapted to activate only said front horn.

2. The combination of claim 1, and a normally open horn switch interconnecting said power source and said rear horn, whereby said rear horn may be energized when said gearshift means is in any of said additional control positions.

References Cited in the file of this patent

UNITED STATES PATENTS 2,829,213   Brett _____ Apr. 1, 1958